(12) United States Patent
Tsuchiya

(10) Patent No.: US 11,454,869 B2
(45) Date of Patent: Sep. 27, 2022

(54) VIBRATION ACTUATOR, CAMERA PLATFORM, AND ELECTRONIC APPARATUS

(71) Applicant: CANON KABUSHIKI KAISHA, Tokyo (JP)

(72) Inventor: Satoshi Tsuchiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 16/697,663

(22) Filed: Nov. 27, 2019

(65) Prior Publication Data

US 2020/0174347 A1 Jun. 4, 2020

(30) Foreign Application Priority Data

Nov. 30, 2018 (JP) .............................. JP2018-225869

(51) Int. Cl.
| | |
|---|---|
| G03B 17/56 | (2021.01) |
| H02N 2/00 | (2006.01) |
| G01K 7/22 | (2006.01) |
| H02N 2/10 | (2006.01) |
| H01C 7/00 | (2006.01) |
| G01K 7/02 | (2021.01) |

(52) U.S. Cl.
CPC ............. *G03B 17/561* (2013.01); *G01K 7/02* (2013.01); *G01K 7/223* (2013.01); *H01C 7/008* (2013.01); *H02N 2/006* (2013.01); *H02N 2/009* (2013.01); *H02N 2/0085* (2013.01); *H02N 2/103* (2013.01)

(58) Field of Classification Search
USPC ......................................................... 396/428
See application file for complete search history.

(56) References Cited

U.S. PATENT DOCUMENTS

| | | | | |
|---|---|---|---|---|
| 6,147,565 A | * | 11/2000 | Satoh ....................... | H03B 5/32 331/70 |
| 6,859,110 B2 | * | 2/2005 | Satoh ....................... | H03B 5/04 331/158 |
| 7,109,639 B2 | | 9/2006 | Yamamoto et al. | |
| 2005/0023935 A1 | * | 2/2005 | Satoh ..................... | H03L 1/028 310/344 |
| 2011/0292528 A1 | * | 12/2011 | Kariya ................... | H02N 2/163 29/596 |

(Continued)

FOREIGN PATENT DOCUMENTS

| | | |
|---|---|---|
| JP | 06-284753 A | 10/1994 |
| JP | 09-98589 A | 4/1997 |

(Continued)

OTHER PUBLICATIONS

Office Action dated Jun. 14, 2022, in Japanese Patent Application No. 2018-225869.

*Primary Examiner* — Rodney E Fuller
(74) *Attorney, Agent, or Firm* — Venable LLP

(57) ABSTRACT

A vibration actuator includes a vibrator including an elastic body and an electro-mechanical energy conversion element; a contact body provided so as to be brought into contact with the vibrator; a flexible printed board configured to feed power to the electro-mechanical energy conversion element; and a temperature detection unit provided on a region of the flexible printed board, in which the flexible printed board and the electro-mechanical conversion element overlap each other.

12 Claims, 11 Drawing Sheets

(56) References Cited

U.S. PATENT DOCUMENTS

| | | | |
|---|---|---|---|
| 2015/0288298 A1* | 10/2015 | Uebayashi | G02B 7/04 |
| | | | 310/317 |
| 2016/0118914 A1* | 4/2016 | Ifuku | H01L 41/257 |
| | | | 29/25.35 |
| 2017/0163176 A1 | 6/2017 | Tsuchiya et al. | |
| 2019/0140558 A1* | 5/2019 | Furuta | H04N 5/2254 |

FOREIGN PATENT DOCUMENTS

| | | |
|---|---|---|
| JP | 2000-101346 A | 4/2000 |
| JP | 2004-320846 A | 11/2004 |
| JP | 2007-281356 A | 10/2007 |
| JP | 2008-080622 A | 4/2008 |
| JP | 2008-125146 A | 5/2008 |
| JP | 4261964 B2 | 5/2009 |
| JP | 2010-114986 A | 5/2010 |
| JP | 2017-108615 A | 6/2017 |

* cited by examiner

VIBRATION ACTUATOR, CAMERA PLATFORM, AND ELECTRONIC APPARATUS

BACKGROUND OF THE INVENTION

Field

The present disclosure relates to a vibration actuator including a contact body and a vibrator, and to a camera platform and an electronic apparatus, each including the vibration actuator.

Description of the Related Art

A vibration actuator has been put into practical use as, for example, a drive motor for autofocusing a photographing lens of a single-lens reflex camera due to its features such as low speed and large torque. In recent years, application of the vibration actuator to various electronic apparatus other than a camera has been expected. For example, the application of the vibration actuator to, for example, joint drive of a robot arm, rotary drive of a robot hand, rotary drive of a camera platform for an image pickup apparatus such as a monitoring camera, or rotary drive of a photosensitive drum for an image forming apparatus has been expected.

For the application to other purposes of use described above, there have been required increase in output of the vibration actuator and a more stable operation of the vibration actuator in a high-temperature environment. However, for example, reduction in friction efficiency between a vibrator and a contact body or peel-off of a bonded portion between an elastic body and a piezoelectric element, which form a vibrator, may occur in the vibration actuator due to a temperature rise. Thus, there is a fear in that performance of the vibration actuator may be adversely affected. Thus, it is necessary to detect a temperature of the vibration actuator, and control and operate the vibration actuator based on the detected temperature. Main heat generating sources in the vibration actuator are a friction portion at which the vibrator and the contact body are brought into contact with each other, and the piezoelectric element, which is a vibration source included in the vibrator. Thus, a vicinity of the friction portion or the piezoelectric element is a high-temperature portion having the highest temperature. Further, performance deterioration due to the temperature rise of the vibration actuator also occurs at the high-temperature portion. Accordingly, a measurement is required to be performed at the high-temperature portion as a representative point for the temperature of the vibrator. For the measurement of the temperature, there has been proposed a technology of mounting a temperature sensor to the vibrator of the vibration actuator and detecting a temperature (see Japanese Patent Application Laid-Open No. H09-98589 and Japanese Patent Application Laid-Open No. H06-284753).

With the technology described in Japanese Patent Application Laid-Open No. H09-98589, however, the temperature sensor is provided to an inner periphery portion of a stator having a disc-like shape, which is far from an outer periphery portion on which the piezoelectric elements are provided, and the friction portion. Thus, a temperature at the temperature measurement point is lower than temperatures at the heat generating sources, and there arises a problem in that the temperature of the high-temperature portion of the vibrator cannot be precisely measured.

Further, with the technology described in Japanese Patent Application Laid-Open No. H06-284753, wirings for the temperature sensor are provided to a portion in which an amplitude of a driving vibration of the vibrator is large. Thus, there arises a problem in that the wirings may be vibrated to generate abnormal noise (squeal) in the vibration actuator.

Further, with the technology described in Japanese Patent Application Laid-Open No. H09-98589 and Japanese Patent Application Laid-Open No. H06-284753, a step of mounting the temperature sensor is required at the time of assembly of the vibration actuator. Thus, there arises a common problem in that the assembly becomes complicated.

In view of the problems described above, the present disclosure provides a vibration actuator, with which a temperature of the vibration actuator can be effectively measured while suppressing generation of abnormal noise, a camera platform, and an electronic apparatus, each including the vibration actuator.

SUMMARY OF THE INVENTION

In order to solve the above-mentioned problems, there is provided a vibration actuator including: a vibrator including an elastic body and an electro-mechanical energy conversion element; a contact body provided so as to be brought into contact with the vibrator; a flexible printed board configured to feed power to the electro-mechanical energy conversion element; and a temperature detection unit provided on a region of the flexible printed board, in which the flexible printed board and the electro-mechanical conversion element overlap each other.

According to one embodiment of the present disclosure, the vibration actuator, with which the temperature of the vibration actuator can be effectively measured while suppressing generation of abnormal noise, the camera platform, and the electronic apparatus, each including the vibration actuator can be provided.

Further features of the present invention will become apparent from the following description of exemplary embodiments with reference to the attached drawings.

DESCRIPTION OF THE EMBODIMENTS

Embodiments will now be described in detail in accordance with the accompanying drawings.

First Embodiment

Figure 1:
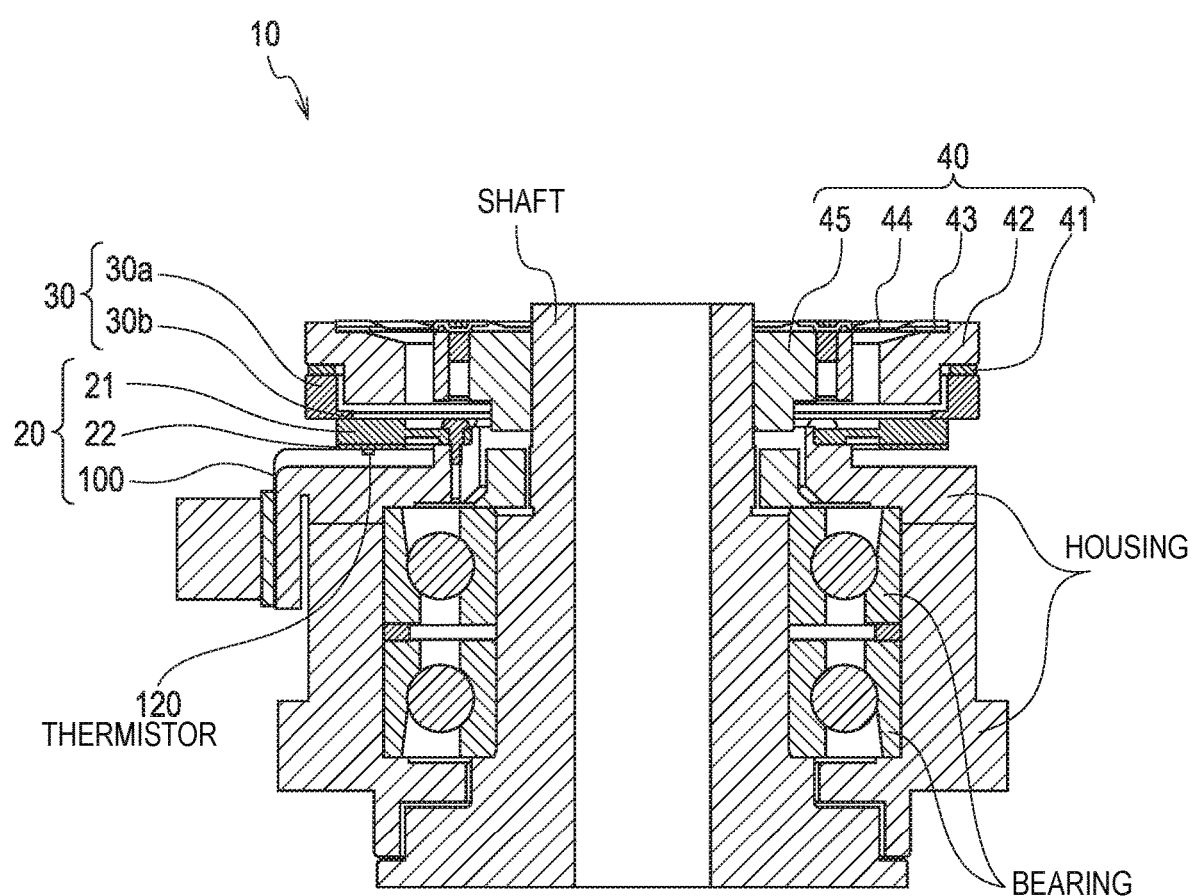
FIG. 1 is a sectional view for schematically illustrating a configuration of a vibration actuator according to a first embodiment of the present disclosure.

FIG. 1 is a sectional view for schematically illustrating a configuration of an actuator 10 according to a first embodiment of the present disclosure. Mechanical configurations of, for example, a vibrator 20, a contact body (driven body) 30, and a pressurizing mechanism 40 in the vibration actuator 10 are equivalent to those of a vibration actuator described in, for example, Japanese Patent Application Laid-Open No. 2017-108615 in terms of functions.

The vibration actuator according to this embodiment includes a vibrator including an elastic body and an electro-mechanical energy conversion element and a contact body provided so as to be brought into contact with the vibrator. Further, the vibration actuator includes a flexible printed board configured to feed power to the electro-mechanical energy conversion element and a temperature detection unit provided on a region of the flexible printed board, in which the flexible printed board and the electro-mechanical conversion element overlap each other.

In FIG. 1, the vibration actuator 10 includes the vibrator 20 formed in an annular shape, the contact body 30 formed in an annular shape, and the pressurizing mechanism 40. Further, the vibration actuator 10 includes a shaft, a housing, and bearings.

The term "contact body" herein means a member, which is to be brought into contact with the vibrator, and is relatively moved with respect to the vibrator due to a vibration generated in the vibrator. The contact between the contact body and the vibrator is not limited to direct contact, specifically, contact between the contact body and the vibrator without intermediation of another member. The contact between the contact body and the vibrator may be indirect contact between the contact body and the vibrator through intermediation of another member therebetween as long as the contact body is relatively moved with respect to the vibrator due to a vibration generated in the vibrator. The "another member" is not limited to a member independent of the contact body and the vibrator (for example, a high friction member made of a sintered body). The "another member" may be a surface-treated portion formed on the contact body or the vibrator, which is formed by, for example, plating or a nitriding treatment.

The vibrator 20 includes an elastic body 21, a piezoelectric element 22, and a power feeding member 100. The piezoelectric element 22 is an electro-mechanical energy conversion element joined to the elastic body 21. The power feeding member 100 is joined to the piezoelectric element 22, and is configured to apply a driving voltage being an AC voltage to the piezoelectric element 22. A thermistor 120, which is a temperature detection unit, is provided to the power feeding member 100.

The contact body 30 includes a main body 30a and a contact spring 30b. As a material of the contact body 30, an iron-based material such as stainless steel may be used. However, the material of the contact body 30 is not limited thereto.

The pressurizing mechanism 40 includes a vibration-proof rubber 41, a pressurizing-spring receiving member 42, a pressurizing-spring receiving rubber 43, a pressurizing spring 44, and a pressurizing-spring fixing member 45. The vibrator 20 and the contact body 30 are concentrically arranged about the shaft as a center axis, and are brought into pressure contact (friction contact) with each other in a thrust direction of the shaft by the pressurizing mechanism 40 fixed to the shaft. More specifically, the pressurizing spring 44, which is restricted from moving by the pressurizing-spring fixing member 45 fixed to the shaft, presses the contact body 30 in the thrust direction through intermediation of the vibration-proof rubber 41, the pressurizing-spring receiving member 42, and the pressurizing-spring receiving rubber 43. With the configuration described above, the contact body 30 and the vibrator 20 are stably brought into contact with each other.

Figure 2:
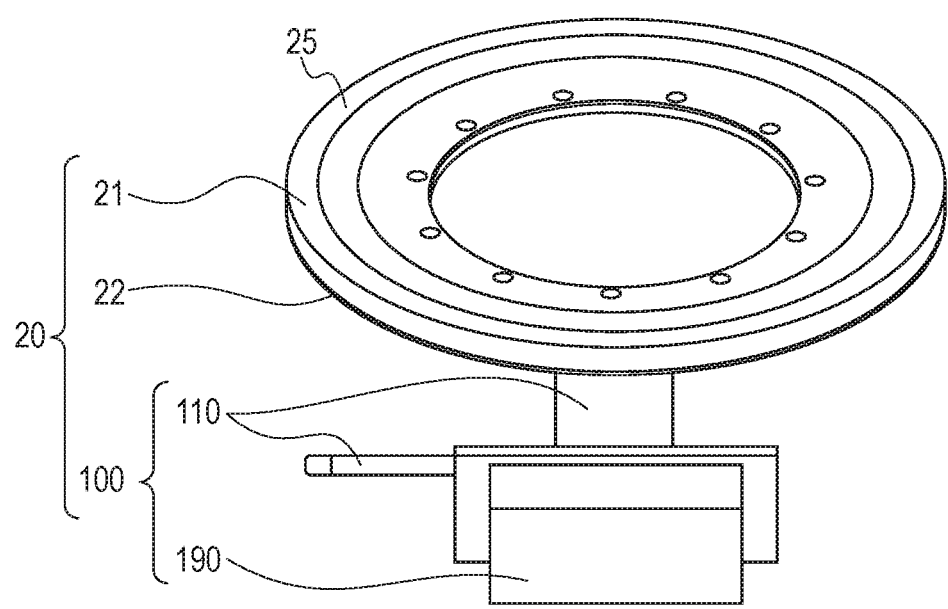
FIG. 2 is a perspective view for schematically illustrating a configuration of a vibrator in FIG. 1.

FIG. 2 is a perspective view for schematically illustrating a configuration of the vibrator 20.

The power feeding member 100 includes a flexible printed board 110 and a drive connector 190. The flexible printed board 110 is joined to the piezoelectric element 22 having an annular shape. The drive connector 190 is connected to the flexible printed board 110.

Figure 3:
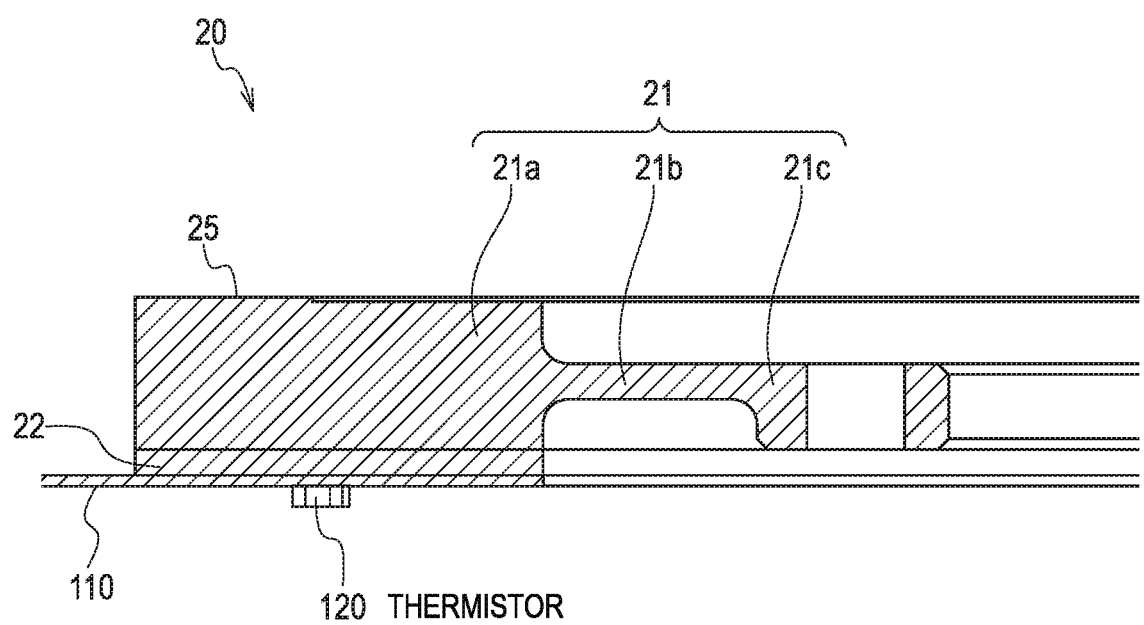
FIG. 3 is a sectional view for schematically illustrating the configuration of the vibrator in FIG. 1.

FIG. 3 is a sectional view for schematically illustrating the configuration of the vibrator 20. FIG. 3 is an illustration of a cross section including the thermistor 120, which is the same as a cross section illustrated in FIG. 1. Thickness portions of the elastic body 21, the piezoelectric element 22, and the flexible printed board 110 on the cross section are hatched in FIG. 3. Portions of the elastic body 21, the piezoelectric element 22, and the flexible printed board 110, which are present in a depth direction on the drawing sheet, are drawn with lines.

In FIG. 3, the elastic body 21 is formed of an annular member. The elastic body 21 includes a base portion 21a, a connecting portion 21b, and a mount portion 21c, which are formed integrally with each other. The connecting portion 21b is formed on a radially inner side of the base portion 21a, and is configured to support the base portion 21a. On a radially inner side of the connecting portion 21b, the mount portion 21c configured to fix the elastic body 21 to the housing is formed. A material of the elastic body 21 may be suitably selected. In this embodiment, an iron-based material such as a stainless steel subjected to nitrization is used.

One of surfaces of the base portion 21a of the elastic body 21 is a contact portion 25, which is to be brought into pressure contact with the contact body 30. The piezoelectric element 22 is joined to another one of the surfaces of the base portion 21a. The flexible printed board 110 is joined to the piezoelectric element 22. The thermistor 120, which is a temperature detection unit for the vibrator 20, is mounted on the flexible printed board 110.

The elastic body 21 is fixed to the housing by threadedly engaging a hole formed in the mount portion 21c and a hole formed in the housing. The housing includes the bearings. The bearings pivotably support the shaft.

In the vibration actuator 10, a driving voltage, which is an AC voltage, is applied to the piezoelectric element 22 through intermediation of the drive connector 190 and the flexible printed board 110, which are included in the power feeding member 100, to excite a driving vibration in the vibrator 20. A mode of the driving vibration depends on the number of a plurality of electrodes of the piezoelectric element 22 or arrangement patterns of the electrodes. The piezoelectric element 22 is designed so that the driving vibration to be excited becomes an n-th order (n=9 in this embodiment) traveling wave traveling in a circumferential direction of the vibrator 20. The n-th order driving vibration is a bending vibration having n waves in the circumferential direction of the base portion 21a. The driving vibration generated in the piezoelectric element 22 is transmitted to the base portion 21a of the vibrator 20. The contact body 30 is driven in the circumferential direction about the shaft by the traveling wave generated at the contact portion 25. Specifically, the contact body 30 makes a rotary motion relative to the vibrator 20 while keeping concentricity with the vibrator 20. A rotary force generated in the contact body 30 is output to an outside through intermediation of the pressurizing mechanism 40 and the shaft.

The vibration actuator 10 according to this embodiment, which is illustrated in FIG. 1, can freely rotationally drive a target to be moved such as a camera with, for example, fixation of the housing to a desired member and fixation of the target to be moved onto a flange surface. The flange surface is formed so as to expand outward from a lower end of the shaft in a downward direction. Meanwhile, the housing can be rotationally driven while the shaft is fixed.

Figure 4:
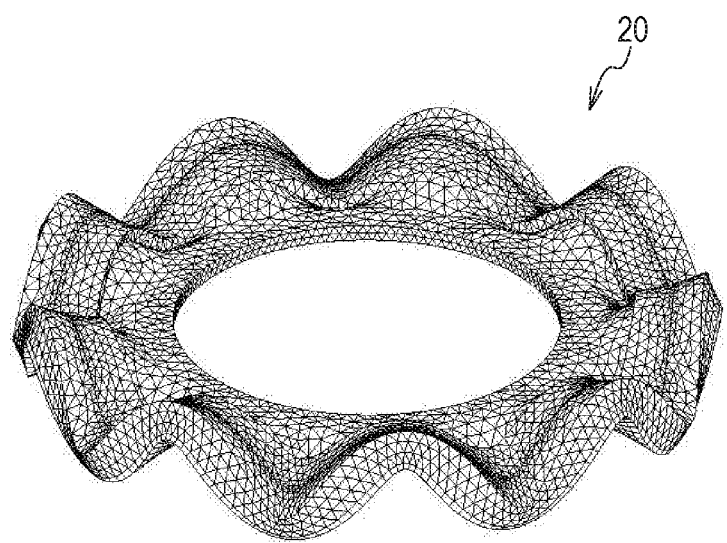
FIG. 4 is an illustration of a mode of deformation of a driving vibration excited in the vibrator in FIG. 1.

FIG. 4 is a view for illustrating a mode of deformation of the driving vibration excited in the vibrator 20. In FIG. 4, for easy understanding of displacement of the driving vibration excited in the vibrator 20, the displacement is illustrated in an exaggerated manner as compared to actual displacement. The power feeding member 100 is not shown.

Figure 5:
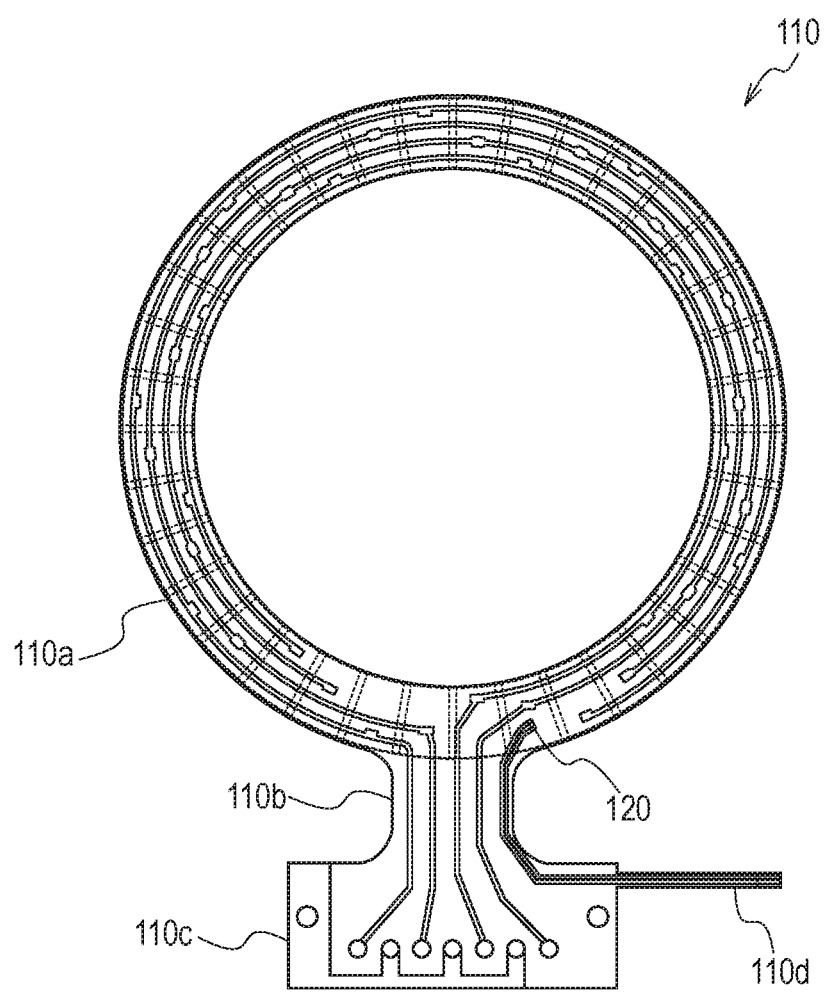
FIG. 5 is a view for schematically illustrating a configuration of a flexible printed board in FIG. 1.

FIG. 5 is a view for schematically illustrating a configuration of the flexible printed board 110.

In the vibration actuator according to this embodiment, the flexible printed board includes a first terminal portion and a first wiring portion, which are to be connected to the electro-mechanical conversion element. Further, the vibration actuator includes a second terminal portion and a second wiring portion, which are provided separately from the first terminal portion and the first wiring portion, and which are to be connected to the temperature detection unit.

The flexible printed board 110 includes wirings and terminals, which are provided to a planar base material made of a soft resin. In a resin portion of the flexible printed board 110, a joint surface to which the piezoelectric element 22 joins, a surface on the side opposite to the joint surface, and the resin portion including a region between the joint surface and the surface on the opposite side are hereinafter collectively referred to as "joint portion".

In a region in which the flexible printed board 110 and the piezoelectric element 22 overlap each other, the flexible printed board 110 and the piezoelectric element 22 are adjacent to each other. Thus, as a result of examination by the inventor of the present application, it was found that a temperature of the above-mentioned region is substantially equal to a temperature of the piezoelectric element 22. In addition, it was also found that a temperature of the base portion 21a of the vibrator 20, which is bonded onto the flexible printed board 110, is substantially equal to a temperature of the contact portion 25, which may be a heat source.

Based on the findings described above, the flexible printed board 110 is formed to have the following configuration in this embodiment.

The flexible printed board 110 includes a joint portion 110a and a first terminal portion 110c. The joint portion 110a is to be joined to the piezoelectric element 22 by bonding. The drive connector 190 is to be mounted on the first terminal portion 110c. In addition, the flexible printed board 110 also includes a relay portion 110b and a second terminal portion 110d. The relay portion 110b is located between the joint portion 110a and the first terminal portion 110c. The second terminal portion 110d projects from part of the first terminal portion 110c.

The thermistor 120 is mounted on the joint portion 110a of the flexible printed board 110. Broken lines in FIG. 5 indicate an electrode pattern formed on the piezoelectric element 22 and an outer shape of the piezoelectric element 22. An electrode of the piezoelectric element 22 is divided into a quadruple of the order n of the driving vibration (9×4=36 in this embodiment) in the circumferential direction. A size of one electrode in the circumferential direction is approximately one-quarter of a wavelength of the driving vibration in the circumferential direction.

Figure 6:
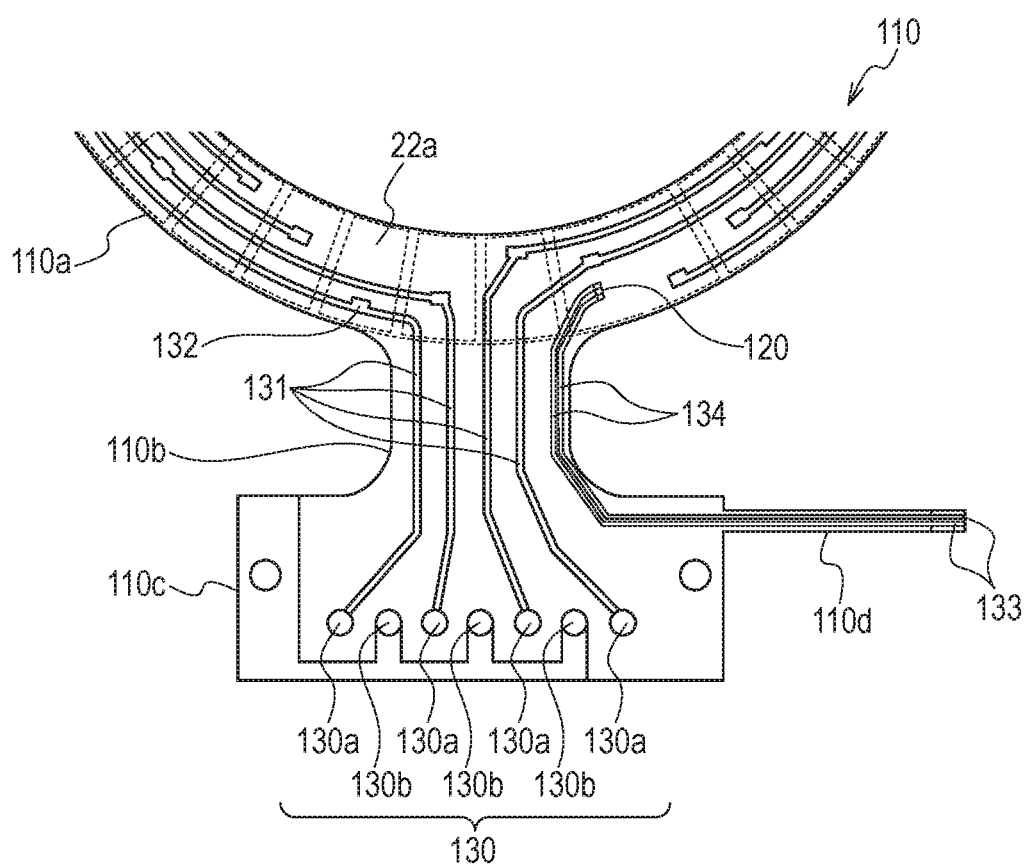
FIG. 6 is an enlarged view of part of the flexible printed board in FIG. 5.

FIG. 6 is an enlarged view of part of the flexible printed board 110 in FIG. 5. The first terminal portion 110c includes driving terminals 130 configured to electrically connect the drive connector 190. The driving terminals 130 include four voltage application terminals 130a and three GND terminals 130b. The voltage application terminals 130a are configured to apply a driving voltage for exciting the driving vibration. The GND terminals 130b are connected to the elastic body 21 via the housing.

The four voltage application terminals 130a are connected to a plurality of electrodes 22a of the piezoelectric element 22 through intermediation of driving wirings 131 and driving electrodes 132. The driving wirings 131 are provided on the joint portion 110a, the relay portion 110b, and the first terminal portion 110c. The driving electrodes 132 are provided on the joint portion 110a. The plurality of electrodes 22a are arranged in a circumferential pattern.

The thermistor 120 is provided on the joint portion 110a. The joint portion 110a is the region in which the flexible printed board 110 and the piezoelectric element 22 overlap each other. The thermistor 120 is connected to a temperature detecting circuit (not shown) via thermistor wirings 134 and thermistor terminals 133. The thermistor terminals 133 are provided to a distal end of the second terminal portion 110d.

The thermistor terminals 133 are formed of a flexible flat cable (FFC). The thermistor 120 and the thermistor wirings 134 are isolated from the wirings and the electrodes for exciting the driving vibration of the vibrator 20, such as the driving wirings 131 and the driving electrodes 132.

In the vibration actuator according to this embodiment, the contact body, the elastic body, the piezoelectric element, and the flexible printed board are arranged in the stated order.

Heat generating sources at the time of driving of the vibrator 20 of the vibration actuator 10 include a loss generated due to a vibration of the base portion 21a of the elastic body 21 and the piezoelectric element 22 and a loss generated due to friction caused by friction contact between the elastic body 21 and the contact body 30. During the driving, a temperature in the vicinity of the base portion 21a of the vibrator 20 becomes the highest. An excessive temperature rise may change performance of the piezoelectric element 22, a vibration characteristic of the vibrator 20, and a friction characteristic between the vibrator 20 and the contact body 30. In addition, adhesion peeling between the elastic body 21 and the piezoelectric element 22 and adhesion peeling between the piezoelectric element 22 and the flexible printed board 110 may be caused.

As described above, the temperature of the joint portion 110a of the flexible printed board 110, which is joined to the piezoelectric element 22, is substantially equal to the temperature of the base portion 21a. Thus, with a temperature measurement with use of the thermistor 120 provided on the joint portion 110a of the flexible printed board 110, the temperature at the high-temperature portion of the vibrator 20 can be measured.

In this embodiment, the thermistor wirings 134 are provided on the relay portion 110b of the flexible printed board 110, on which the drive wirings 131 are provided. Thus, in contrast to a related-art method of providing the thermistor wirings separately from the flexible printed board, the number of components associated with the thermistor wirings can be reduced. Thus, generation of abnormal noise (squeal) due to the wirings at the time of driving of the vibration actuator 10 can be reduced.

In this embodiment, the thermistor 120 is mounted on the flexible printed board 110 bonded to the piezoelectric element 22 of the vibration actuator 10. Thus, in a manufacture process for the vibrator 20, a step of individually mounting the thermistor 120 on the vibrator 20 is eliminated. Thus, an assembly step can be simplified.

In this embodiment, a withstand voltage required for the thermistor terminals 133 is smaller than a withstand voltage required for the driving terminals 130. Thus, the drive terminals 130 are formed separately from the thermistor terminals 133. As a result, each of the thermistor terminals 133 having a low withstand voltage can be downsized.

It is desired that inhibition of the drive vibration of the vibrator 20 by the thermistor 120, generation of a crack in the thermistor 120, and a connection failure at a mounting portion for the thermistor 120 be reduced as much as possible. Thus, it is preferred that large load in a bending direction due to bending deformation of the vibrator 20, which is caused by the driving vibration, be not applied to the thermistor 120.

Thus, the thermistor 120 may have such a configuration that a long-side direction of the temperature detection unit extends along a radial direction of the elastic body having the annular shape.

More specifically, it is preferred that a short-side direction of a main body portion of the thermistor 120 (a direction orthogonal to a direction in which two mounting solders are arranged) match with a direction in which the wavelength of the driving vibration of the vibrator 20 is shorter.

In the vibration actuator according to this embodiment, the wavelength of the traveling wave generated in the circumferential direction is shorter than a width of the vibrator 20 between an inner periphery and an outer periphery in a radial direction.

Thus, the thermistor 120 is arranged so that a long-side direction of the thermistor 120 extends along the radial direction of the vibrator 20. More preferably, the long-side direction of the thermistor 120 suitably matches with the radial direction of the vibrator 20. With the configuration described above, the long-side direction of the thermistor 120 is arranged along a wave crest of the traveling wave. Thus, a weight applied on the main body portion of the thermistor 120 along with the generation of the traveling wave can be further reduced.

In order to prevent the generation of a crack in the thermistor 120 or a connection failure at the mounting portion for the thermistor 120, it is preferred that a dimension of the thermistor 120 be sufficiently smaller than the wavelength of the driving vibration of the vibrator 20. As a guide of the dimension of the thermistor 120, it is preferred that the dimension of the thermistor 120 be equal to or smaller than one-quarter of the wavelength of the driving vibration.

More preferably, when the main body portion of the thermistor 120 has a cuboidal shape, it is preferred that the largest dimension among a long-side dimension, a short-side dimension, and a height dimension of the thermistor 120 be equal to or smaller than one-quarter of the wavelength of the driving vibration.

In this embodiment, the thermistor 120 is used as the temperature detection unit. However, the temperature detection unit is not limited thereto. Any sensor may be used as long as the temperature can be measured. As examples of the sensor, a thermocouple, a resistance temperature detector, or an IC temperature sensor are given.

Figure 7:
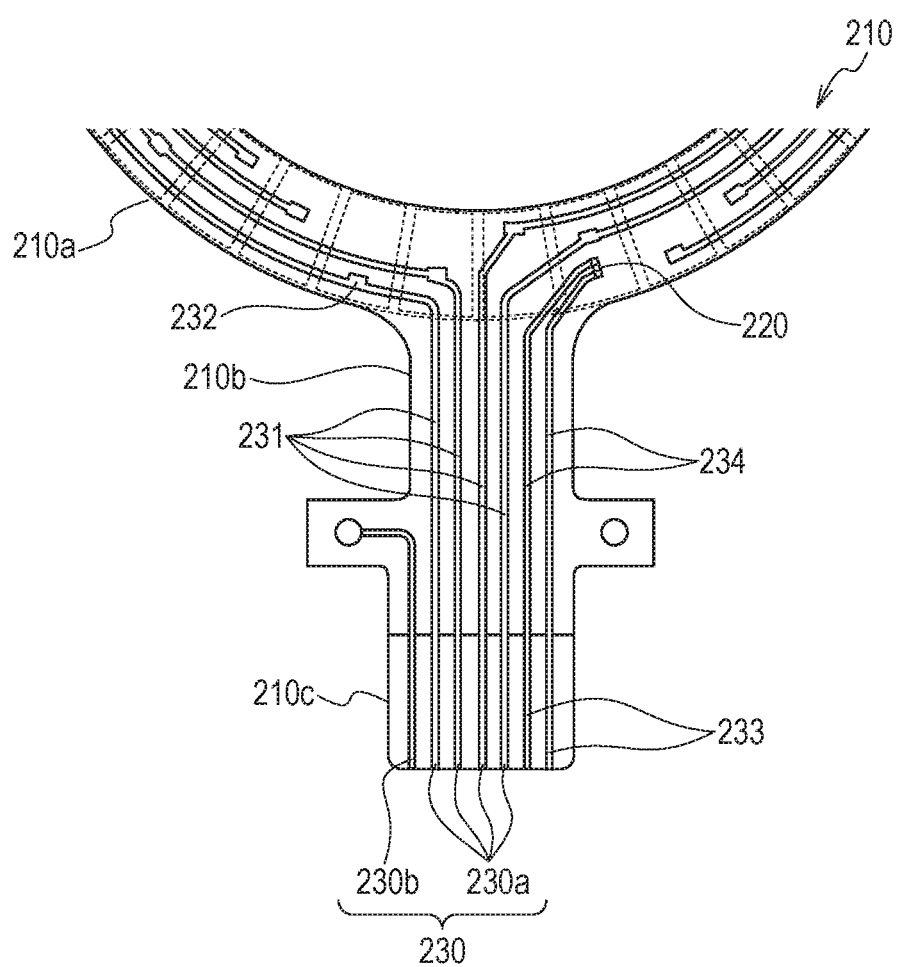
FIG. 7 is a view for illustrating part of a flexible printed board of a first modification example of the vibrator in FIG. 1.

FIG. 7 is a view for illustrating part of a flexible printed board 210 of a first modification example of the vibrator. The flexible printed board 210 includes a joint portion 210a, a relay portion 210b, and a terminal portion 210c. The joint portion 210a is to be joined to the piezoelectric element 22 by bonding. The terminal portion 210c has a distal end formed as a flexible flat cable (FFC). The relay portion 210b is located between the joint portion 210a and the terminal portion 210c. A thermistor 220 is mounted on the joint portion 210a of the flexible printed board 210.

In this modification example, a drive connector is not used, and the terminal portion 210c of the flexible printed board 210 has the distal end formed as the flexible flat cable (FFC). Thermistor wirings 234 are provided on the relay portion 210b of the flexible printed board 210, and are connected to thermistor terminals 233. The thermistor terminals 233 and driving terminals 230 form one flexible flat cable (FFC). The driving terminals 230 include four voltage application terminals 230a and one GND terminal 230b. The GND terminal 230b is connected to the elastic body 21 via the housing.

In this embodiment, the GND terminal 230b for a driving voltage to be applied to the piezoelectric element 22 is connected to the elastic body 21 via the housing. However, a method of connecting the GND terminal 230b is not limited thereto. The elastic body 21 is only required to be connected to the GND terminal 230b and be electrically grounded without via the housing.

Second Embodiment

Figure 8:
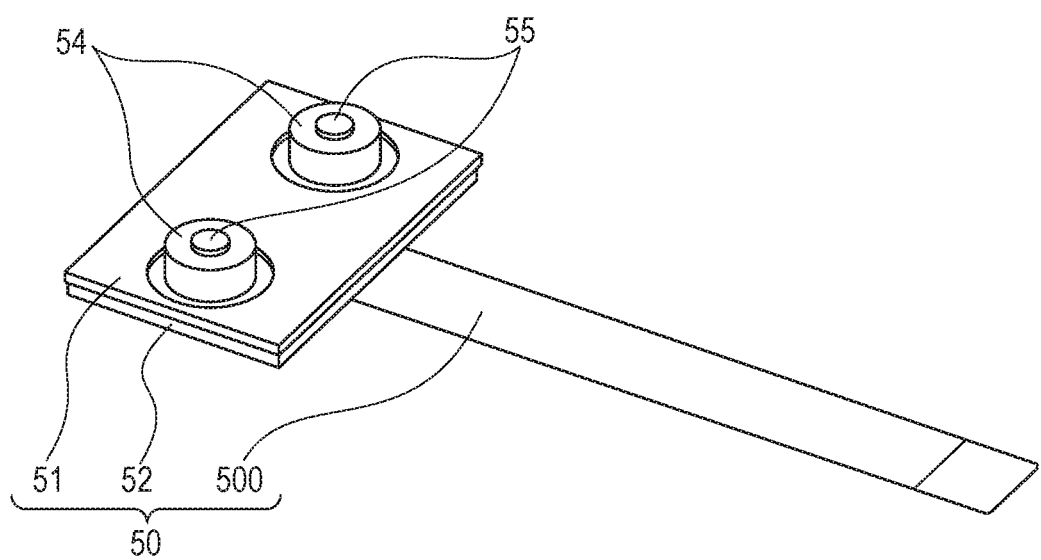
FIG. 8 is a perspective view for schematically illustrating a configuration of a vibrator included in a vibration actuator according to a second embodiment of the present disclosure.

FIG. 8 is a perspective view for schematically illustrating a configuration of a vibrator 50 for forming a vibration actuator according to a second embodiment of the present disclosure. The configuration of the vibrator 50 is equivalent to, for example, a vibrator for forming a vibration drive device, which is disclosed in Japanese Patent No. 4261964.

The vibrator 50 includes an elastic body 51 having a flat plate shape, a piezoelectric element 52, and a power feeding member 500. The piezoelectric element 52 is joined to the elastic body 51. The power feeding member 500 includes a flexible printed board joined to the piezoelectric element 52 by bonding.

The elastic body 51 includes two projecting portions 54, which are formed on a surface opposite to a surface to which the piezoelectric element 52 is joined. The projecting portions 54 are formed with a predetermined distance therebetween. A contact body (not shown) is held in pressure contact with contact portions 55, which correspond to distal end surfaces of the projecting portions 54, in a projecting direction of the projecting portions 54.

Figure 9A:
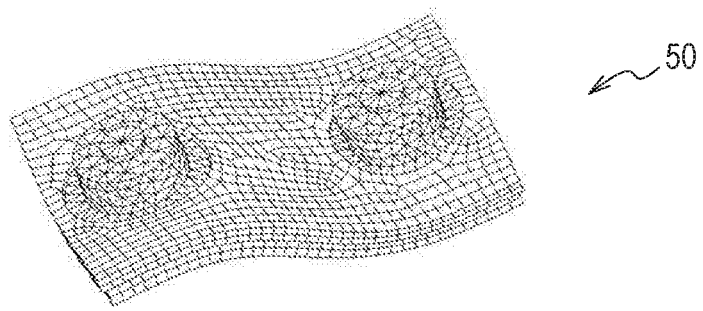
FIG. 9A is an illustration of a mode of deformation of the vibrator with a vibration in a first vibration mode, which is excited in the vibrator in FIG. 8.
Figure 9B:
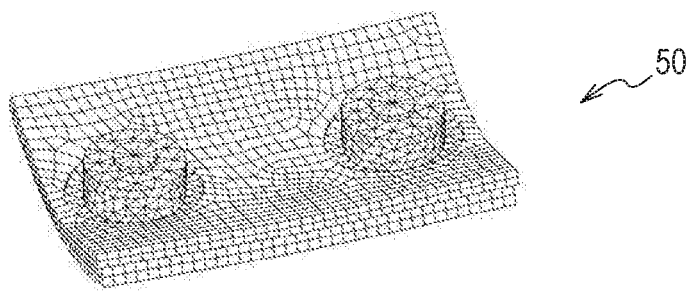
FIG. 9B is an illustration of a mode of deformation of the vibrator with a vibration in a second vibration mode, which is excited in the vibrator in FIG. 8.

With application of a drive signal to the piezoelectric element 52, a driving vibration resulting from synthesis of a first vibration and a second vibration, which are set in advance in the vibrator 50, is excited in the vibrator 50. FIG. 9A is an illustration of deformation of the vibrator 50 with a vibration in a first vibration mode, which is deformation in the vibrator 50, and FIG. 9B is an illustration of deformation of the vibrator 50 with a vibration in a second vibration mode, which is generated in the vibrator 50. For easy understanding of vibration displacement occurring in the vibrator 50, the deformation (displacement) is illustrated in an exaggerated manner in FIG. 9A and FIG. 9B in comparison to actual one. The power feeding member 500 is not shown.

In the first vibration mode illustrated in FIG. 9A, there is generated such a bending vibration that two antinodes of a vibration are generated in the elastic body 51 in a direction of connecting the two projecting portions 54 (long-side direction of the elastic body 51). In the second vibration mode illustrated in FIG. 9B, there is generated such a bending vibration that one antinode is generated in a direction orthogonal to a loop line in the first vibration mode (short-side direction of the elastic body 51). With the application of the drive signal to the piezoelectric element 52 joined to the elastic body 51, a standing wave of a vibration resulting from synthesis of the vibration in the first vibration mode and the vibration in the second vibration mode, which are set in the vibrator 50 in advance, is excited as the driving vibration. With the driving vibration, an elliptic motion is generated in a plane containing a direction of connecting the two projecting portions 54 and the projecting direction of the projecting portions 54 in the contact portions 55. The contact body (not shown) is held in pressure contact with the contact portions 55 of the vibrator 50, and thus is frictionally driven by the contact portions 55 to be linearly driven in the direction of connecting the two projecting portions 54.

A plurality of the vibrators 50 may be arranged on a base material having an annular shape so that a line for connecting the projecting portions 54 of one vibrator 50 becomes a tangent line of the same circumference. Then, with a configuration in which the contact body having the annular shape (or a disc shape) is held in pressure contact with the contact portions 55 so as to be coaxial with the base material, the contact body and the base material can be relatively rotationally moved in a circumferential direction of the base material.

Figure 10:
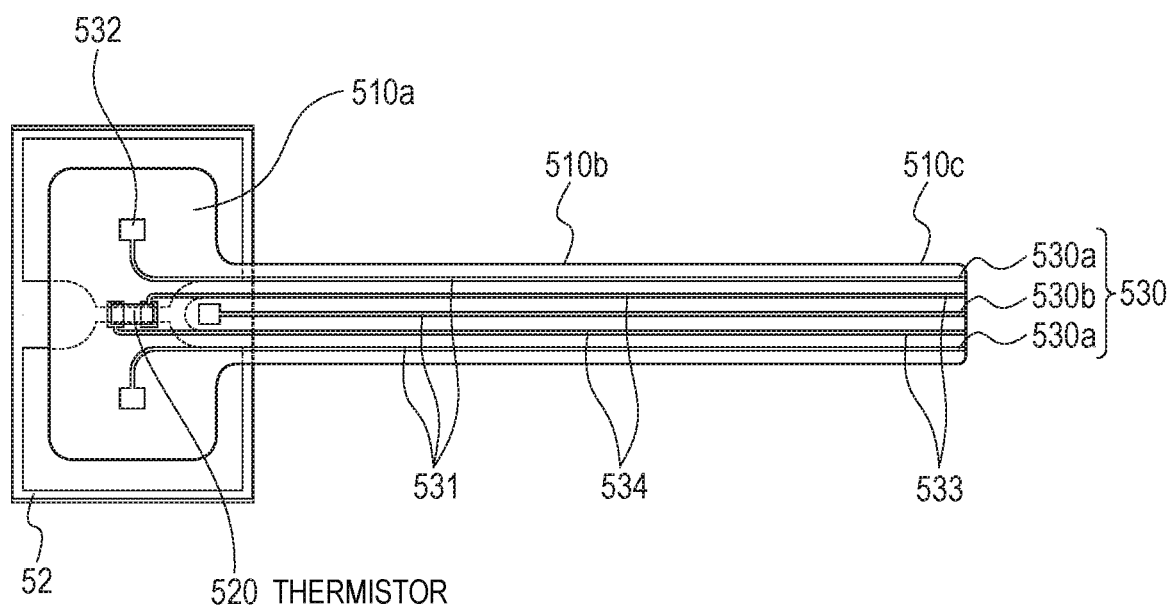
FIG. 10 is a view for schematically illustrating a configuration of a flexible printed board in FIG. 8.

FIG. 10 is a view for schematically illustrating a configuration of a flexible printed board 510 included in the power feeding member 500 in FIG. 8. The flexible printed board 510 includes a joint portion 510a, a relay portion 510b, and a terminal portion 510c. The joint portion 510a is to be joined to the piezoelectric element 52 by bonding. The terminal portion 510c has a distal end formed as a flexible flat cable (FFC). The relay portion 510b is located between the joint portion 510a and the terminal portion 510c. A thermistor 520 is mounted on the joint portion 510a of the flexible printed board 510, which is a region in which the flexible printed board 510 and the piezoelectric element 52 overlap each other. Broken lines in FIG. 10 indicate an outer shape of the piezoelectric element 52 bonded to the flexible printed board 510 and shapes of electrodes thereof. The terminal portion 510c includes driving terminals 530 and thermistor terminals 533.

The driving terminals 530 include two voltage application terminals 530a and one GND terminal 530b. The voltage application terminals 530a are configured to apply a driving voltage for exciting the driving vibration. The GND terminal 530b is connected to the elastic body 51 via the housing.

The thermistor 520 mounted on the joint portion 510a is connected to a temperature detecting circuit (not shown) via thermistor wirings 534, which are provided on the joint portion 510a, the relay portion 510b, and the terminal portion 510c, and thermistor terminals 533. The thermistor 520 and the thermistor wirings 534 are isolated from wirings and electrodes for exciting the driving vibration of the vibrator 50, such as driving wirings 531 and driving electrodes 532.

Heat generating sources at the time of driving of the vibrator 50 of the vibration actuator include a loss generated due to a vibration of the elastic body 51 and the piezoelectric element 52 and a loss generated due to friction caused by friction contact between the elastic body 51 and the contact body. During the driving, a temperature of the elastic body 51 becomes the highest, and the elastic body 51 becomes a high-temperature portion. As a result, performance of the piezoelectric element 52, a vibration characteristic of the vibrator 50, and performance of a friction contact portion with the contact body may change. In addition, adhesion peeling between the elastic body 51 and the piezoelectric element 52 and adhesion peeling between the piezoelectric element 52 and the flexible printed board 510 may be caused. As described in the first embodiment, the temperature of the joint portion 510a of the flexible printed board 510, which is joined to the piezoelectric element 52, is substantially equal to the temperature of the elastic body 51. Thus, with a temperature measurement with use of the thermistor 520 provided on the joint portion 510a of the flexible printed board 510, the temperature at the high-temperature portion of the vibrator 50 can be measured.

Even in this embodiment, effects equivalent to those of the first embodiment can be attained. More specifically, the temperature of the high-temperature portion of the vibrator 50 can be measured. The generation of the squeal is suppressed by reducing the number of components associated with the thermistor wirings. Assembly of the thermistor is simplified in a manufacturing process for the vibrator.

It is desired that inhibition of the drive vibration of the vibrator 50 by the thermistor 520, generation of a crack in the thermistor 520, and a connection failure at a mounting portion for the thermistor 520 be reduced as much as possible. Thus, it is preferred that a large load in a bending direction due to bending deformation of the vibrator 50, which is caused by the driving vibration, be not applied to the thermistor 520.

Thus, it is preferred that the elastic body have a rectangular shape and a long-side direction of the temperature detection unit extend along a short-side direction of the elastic body having the rectangular shape.

Accordingly, it is preferred that a short-side direction of the thermistor 520 (direction orthogonal to a direction in which two mounting solders are arranged) match with a direction in which the wavelength of the driving vibration of the vibrator 50 is shorter. The driving vibration of the vibrator 50 according to this embodiment has a shorter wavelength of the vibration generated in the long-side direction of the elastic body 51 included in the vibrator 50 than a wavelength of the vibration generated in the short-side direction of the elastic body 51. Thus, the thermistor 520 is arranged so that the short-side direction of the thermistor 520 matches with the long-side direction of the vibrator 50.

Specifically, the thermistor 520 is arranged so that the long-side direction of the thermistor 520 is arranged along a wave crest of a vibration wave illustrated in FIG. 9A. Thus, a load applied to the thermistor 520 can be further reduced.

In order to prevent the generation of a crack in the thermistor 520 or a connection failure at the mounting portion for the thermistor 520, it is preferred that a dimension of the thermistor 520 be sufficiently smaller than the wavelength of the driving vibration of the vibrator. 50. As a guide of the dimension of the thermistor 520, it is preferred that the dimension of the thermistor 520 be equal to or smaller than one-quarter of the wavelength of the driving vibration.

In this embodiment, the thermistor 520 is used as the temperature detection unit. However, the temperature detection unit is not limited thereto. Any sensor may be used as long as the temperature can be measured. As examples of the sensor, a thermocouple, a resistance temperature detector, or an IC temperature sensor are given.

Third Embodiment

In a third embodiment, a configuration of a camera platform for an image pickup apparatus such as a monitoring camera is described as an example of a device including the vibration actuator 10, which has been described in the first embodiment.

In the third embodiment, a camera platform is described below. The camera platform includes a rotating table and vibration actuators provided on the rotating table.

Figure 11A:
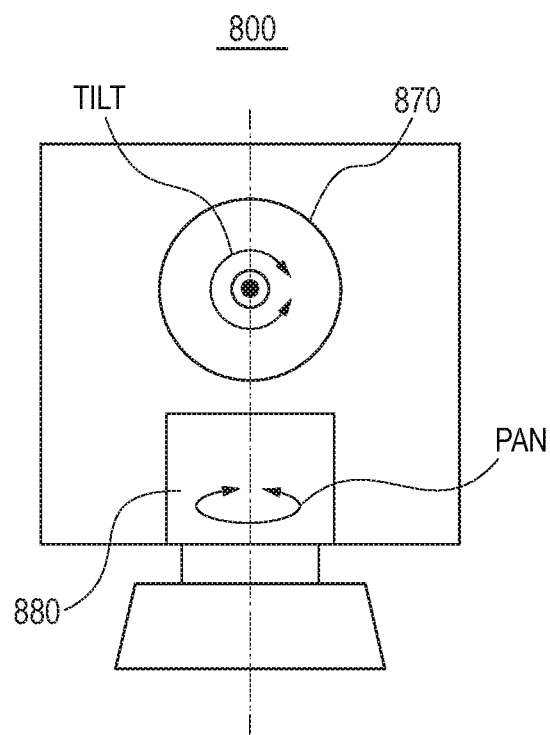
FIG. 11A is a view for illustrating a camera platform on which the vibration actuators according to the first embodiment of the present disclosure are mounted.
Figure 11B:
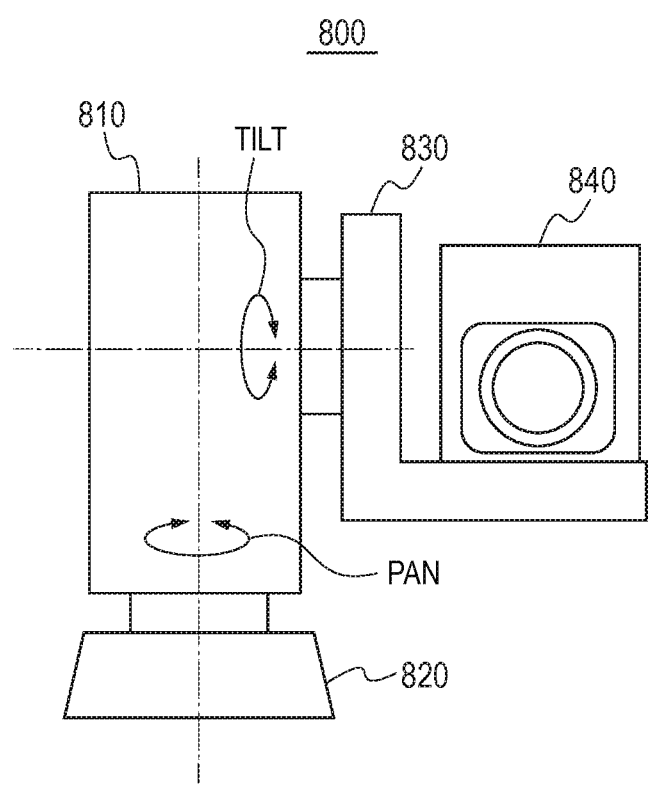
FIG. 11B is a view for schematically illustrating a configuration of an image pickup apparatus mounted on the camera platform.

FIG. 11A is a view for schematically illustrating a configuration of a camera platform 800, and FIG. 11B is a view for schematically illustrating a configuration of an image pickup apparatus 840 mounted to the camera platform 800. The camera platform 800 includes a base 820, a head 810, and an L-shaped angle bar 830. The head 810 includes two vibration actuators 870 and 880. The L-shaped angle bar 830 is configured to fix the image pickup apparatus 840. The vibration actuator 880, which is provided about a pan axis, is configured to rotate the head 810, the L-shaped angle bar 830, and the image pickup apparatus 840 about the pan axis with respect to the base 820. Further, the vibration actuator 870, which is provided about a tilt axis, is configured to rotate the L-shaped angle bar 830 and the image pickup apparatus 840 about the tilt axis with respect to the head 810.

With use of the two vibration actuators 870 and 880 for the camera platform 800, an orientation of the image pickup apparatus 840 can be changed at a high speed and a high response with quietness and high accuracy. Further, each of the vibration actuators 870 and 880 has a high holding torque even during non-energization time. Thus, even when a shift of center of gravity of the image pickup apparatus 840 occurs about the tilt axis, the orientation of the image pickup apparatus 840 can be maintained without consumption of electric power for the vibration actuators.

Besides, an electronic apparatus including a member desired by a user of the present disclosure and the vibration actuator provided to the member may be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-225869, filed Nov. 30, 2018, which is hereby incorporated by reference herein in its entirety.

What is claimed is:

1. A vibration actuator comprising:
    a vibrator including an elastic body and an electro-mechanical energy conversion element;
    a contact body provided so as to be brought into contact with the vibrator;
    a flexible printed board configured to feed power to the electro-mechanical energy conversion element; and
    a temperature detection unit provided on a region of the flexible printed board, in which the flexible printed board and the electro-mechanical conversion element overlap each other,
    wherein the flexible printed board includes:
        a first terminal portion and a first wiring portion, which are to be connected to the electro-mechanical conversion element; and
        a second terminal portion and a second wiring portion, which are provided separately from the first terminal portion and the first wiring portion, and which are to be connected to the temperature detection unit.

2. The vibration actuator according to claim 1, wherein the temperature detection unit comprises one of a thermistor, a thermocouple, a resistance temperature detector, and an IC temperature sensor.

3. The vibration actuator according to claim 1, wherein the contact body, the elastic body, the electro-mechanical energy conversion element, and the flexible printed board are arranged in the stated order.

4. The vibration actuator according to claim 1, wherein the elastic body has a rectangular shape.

5. The vibration actuator according to claim 4, wherein a long-side direction of the temperature detection unit extends along a short-side direction of the elastic body having a rectangular shape.

6. A vibration actuator comprising:
    a vibrator including an elastic body and an electro-mechanical energy conversion element;
    a contact body provided so as to be brought into contact with the vibrator;
    a flexible printed board configured to feed power to the electro-mechanical energy conversion element; and
    a temperature detection unit provided on a region of the flexible printed board, in which the flexible printed board and the electro-mechanical conversion element overlap each other,
    wherein the elastic body has an annular shape.

7. The vibration actuator according to claim 6, wherein a long-side direction of the temperature detection unit extends along a radial direction of the elastic body having the annular shape.

8. A vibration actuator comprising:
    a vibrator including an elastic body and an electro-mechanical energy conversion element;
    a contact body provided so as to be brought into contact with the vibrator;
    a flexible printed board configured to feed power to the electro-mechanical energy conversion element; and
    a temperature detection unit provided on a region of the flexible printed board, in which the flexible printed board and the electro-mechanical conversion element overlap each other,
    wherein a dimension of the temperature detection unit is equal to or less than one-quarter of a wavelength of a driving vibration.

9. A camera platform comprising:
    a vibration actuator including:
        a vibrator including an elastic body and an electro-mechanical energy conversion element;

a contact body provided so as to be held in contact with the vibrator;

a flexible printed board configured to feed power to the electro-mechanical energy conversion element; and a temperature detection unit provided on a region of the flexible printed board, in which the flexible printed board and the electro-mechanical conversion element overlap each other; and a rotating table on which the vibration actuator is provided.

10. An electronic apparatus comprising:

a vibration actuator including:

a vibrator including an elastic body and an electro-mechanical energy conversion element;

a contact body provided so as to be held in contact with the vibrator;

a flexible printed board configured to feed power to the electro-mechanical energy conversion element; and a temperature detection unit provided on a region of the flexible printed board, in which the flexible printed board and the electro-mechanical conversion element overlap each other; and a member to which the vibration actuator is provided, wherein the flexible printed board includes:

a first terminal portion and a first wiring portion, which are to be connected to the electro-mechanical conversion element and a second terminal portion and a second wiring portion, which are provided separately from the first terminal portion and the first wiring portion, and which are to be connected to the temperature detection unit.

11. An electronic apparatus comprising:

a vibration actuator including:

a vibrator including an elastic body and an electro-mechanical energy conversion element;

a contact body provided so as to be held in contact with the vibrator;

a flexible printed board configured to feed power to the electro-mechanical energy conversion element; and a temperature detection unit provided on a region of the flexible printed board, in which the flexible printed board and the electro-mechanical conversion element overlap each other; and a member to which the vibration actuator is provided, wherein the elastic body has an annular shape.

12. An electronic apparatus comprising:

a vibration actuator including:

a vibrator including an elastic body and an electro-mechanical energy conversion element;

a contact body provided so as to be held in contact with the vibrator;

a flexible printed board configured to feed power to the electro-mechanical energy conversion element; and a temperature detection unit provided on a region of the flexible printed board, in which the flexible printed board and the electro-mechanical conversion element overlap each other; and a member to which the vibration actuator is provided, wherein a dimension of the temperature detection unit is equal to or less than one-quarter of a wavelength of a driving vibration.

* * * * *